(12) United States Patent
Collina et al.

(10) Patent No.: US 6,277,918 B1
(45) Date of Patent: Aug. 21, 2001

(54) POLYOLEFIN COMPOSITIONS AND FILMS OBTAINED THEREFROM

(75) Inventors: Gianni Collina, Loc. Cassana; Remo Anibaldi; Marco Ciarafoni, both of Ferrara, all of (IT)

(73) Assignee: Montell Technology Company BV (NL)

( * ) Notice: Subject to any disclaimer, the term of this patent is extended or adjusted under 35 U.S.C. 154(b) by 0 days.

(21) Appl. No.: 09/446,211

(22) PCT Filed: Apr. 29, 1999

(86) PCT No.: PCT/EP99/02913
§ 371 Date: Dec. 17, 1999
§ 102(e) Date: Dec. 17, 1999

(87) PCT Pub. No.: WO99/57194
PCT Pub. Date: Nov. 11, 1999

(30) Foreign Application Priority Data

May 6, 1998 (EP) .................................................. 98201466

(51) Int. Cl.$^7$ ............................ C08L 23/00; C08L 23/14; C08L 23/20
(52) U.S. Cl. ............................................ 525/191; 525/240
(58) Field of Search ..................................... 525/191, 240

(56) References Cited

U.S. PATENT DOCUMENTS

| | | | |
|---|---|---|---|
| 4,075,290 | * 2/1978 | Denzel et al. ...................... | 525/240 |
| 4,218,339 | 8/1980 | Zucchini et al. ..................... | 252/429 |
| 4,472,520 | 9/1984 | Zucchini et al. ..................... | 502/104 |
| 4,748,221 | 5/1988 | Collomb et al. ..................... | 526/153 |
| 4,803,251 | 2/1989 | Goode et al. .......................... | 526/59 |
| 4,916,190 | * 4/1990 | Hwo ..................................... | 525/227 |
| 5,663,236 | 9/1997 | Takahashi et al. ................... | 525/240 |
| 5,889,121 | 3/1999 | Hwo et al. ............................ | 525/240 |

FOREIGN PATENT DOCUMENTS

| | | |
|---|---|---|
| 0 172 961 | 3/1986 | (EP) . |
| 0 395 083 | 10/1990 | (EP) . |
| 0 553 805 | 8/1993 | (EP) . |
| 0 553 806 | 8/1993 | (EP) . |
| 0 688 820 | 12/1995 | (EP) . |
| 8-059855 | 3/1996 | (JP) . |
| 93/03078 | 2/1993 | (WO) . |
| 95/20009 | 7/1995 | (WO) . |

\* cited by examiner

Primary Examiner—Nathan M. Nutter

(57) ABSTRACT

Polyolefin compositions containing from 70 to 99 parts by weight of a composition (A) that includes (i) from 75 to 95% by weight of a copolymer of ethylene with an α-olefin $CH_2=CHR$, where R is an alkyl radical having from 1 to 10 carbon atoms; and (ii) from 5 to 25% by weight of a copolymer of propylene with ethylene and/or an α-olefin $CH_2=CHR^1$, where $R^1$ is an alkyl radical having from 2 to 10 carbon atoms, and from 1 to 30 parts by weight of a polyolefin component (B) that includes crystalline polybutene-1. The compositions can be used for making films.

23 Claims, No Drawings

POLYOLEFIN COMPOSITIONS AND FILMS OBTAINED THEREFROM

This is a 35 U.S.C. 371 application of PCT/EP99/02913 filed Apr. 29, 1999.

The present invention relates to polyolefin compositions endowed with improved processability. Furthermore, the present invention relates to the films obtained from said compositions which show very good mechanical and optical properties. The compositions according to the present invention comprise a first composition (A) comprising an ethylene copolymer (LLDPE type) and a copolymer of propylene with ethylene and/or an α-olefin $CH_2=CHR^1$, wherein $R^1$ is an alkyl radical having from 2 to 10 carbon atoms, said copolymer of propylene having a relatively high insolubility in xylene, said first composition (A) being blended with (B) a crystalline polybutene-1.

Composition comprising an ethylene copolymer (LLDPE type) and a copolymer of propylene with ethylene and/or an α-olefin are already known from WO93/03078 and WO 95/20009. Said compositions show improved processability over the conventional LLDPE polymers. As a consequence, some of the problems related to the use of LLDPE, such as the necessity of widening the slit or increasing the temperature of the extruder heads in order to keep the productivity unaltered, have been solved.

However, it would be desirable, in order to save energy when processing the polymer, to have available polyolefin composition, suitable for the preparation of films, having still improved processability. An improvement in processability for LLDPE polymers is generally achieved by blending them with low density polyethylene (LDPE) obtained by high pressure polymerization. By this way, however, the improvement in processability is obtained at damage of the mechanical properties of the films obtained from these compositions. Indeed, said mechanical properties decrease proportionally with the amount of LDPE used. It would therefore be desirable to have polyolefin compositions with improved processability and being capable, at the same time, to give films keeping very good mechanical and optical properties.

It has unexpectedly been found that the compositions obtained by blending crystalline polybutene-1 with the compositions comprising an ethylene copolymer (LLDPE type) and a copolymer of propylene with ethylene and/or an α-olefin, are endowed with high processability and are capable to give films retaining very good mechanical properties.

It is therefore an object of the present invention to provide polyolefin compositions comprising from 70 to 99 parts by weight of a composition (A) comprising (i) from 75 to 95% by weight of a copolymer of ethylene with an α-olefin $CH_2=CHR$, wherein R is an alkyl radical having from 1 to 10 carbon atoms, said copolymer containing up to 20% by mole of α-olefin and (ii) from 5 to 25% by weight of a copolymer of propylene with ethylene and/or an α-olefin $CH_2=CHR^1$, wherein $R^1$ is an alkyl radical having from 2 to 10 carbon atoms, said copolymer containing from 80 to 98% by weight of propylene and being characterized by insolubility in xylene of higher than 70%; and from 1 to 30 parts by weight of a polyolefin component (B) comprising crystalline polybutene-1.

It is very surprisingly that, differently from what is observed when LDPE is used, the increase in processability, showed by the decreasing of the melt pressure in the extruder, is obtained without detriment of the mechanical properties of the films. Conversely, the presence of polybutene-1 provides an improvement of the mechanical properties over the film obtained from the composition A alone.

The crystalline polybutene-1 used as component (B) of the composition of the invention can be any of the polybutene-1, homo or copolymer with other olefins, having a predominantly isotactic structure. Such polymers are known in the art. The isotactic polybutene-1 (co)polymers can be prepared by polymerizing butene-1 in the presence of $TiCl_3$ based catalyst components together with alkylaluminum halides (such as diethylaluminum chloride—DEAC) as cocatalyst. Polybutene-1 (co)polymers can also be obtained by polymerizing the monomers in the presence of a stereospecific catalyst comprising (a) a solid component comprising a Ti compound and an electron-donor compound supported on $MgCl_2$; (b) an alkylaluminum compound and, optionally, (c) an external electron-donor compound. A process of this type is disclosed for example in EP-A-017296. Preferably the polybutene-1 used has an isotacticity (expressed in terms of pentads mmmm %) higher than 80%, more preferably higher than 85%, and still more preferably higher than 90%.

The melt index (MIE) is generally comprised in the range of from 0.01 to 100 preferably of from 0.1 to 50 and more preferably from 0.1 to 20. When a butene copolymer with one or more other olefins is used, the olefin can be selected preferably from the group consisting of ethylene, propylene, pentene-1, hexene-1 and octene-1. Particularly preferred are the random copolymer with ethylene or propylene containing up to 20% by weight of units deriving from ethylene or propylene or both.

The component (B) in the composition of the invention is present in amounts comprised between 1 and 30 parts by weight, preferably from 5 to 25, and more preferably from 5 to 20 parts by weight.

In the component (A) of the present invention, the insolubility in xylene of component (ii) is preferably higher than 75%, more preferably higher than 85%. The insolubility is determined according to the method described below. Preferably in the said copolymer (ii), the content of propylene ranges between 85 and 96% by weight, and the content of ethylene and/or α-olefin ranges between 4. and 15% by weight. When the copolymer (ii) is a terpolymer of the type ethylene/propylene/α-olefin, and this constitutes a preferred embodiment, the content of ethylene ranges from 2 to 8% by weight while the content of α-olefin $CH_2=CHR^1$ ranges between 2 and 7% by weight. However, the content of ethylene may also be higher than that of the α-olefin $CH_2=CHR^1$. The content of the various components is determined by IR and NMR analysis.

The α-olefin $CH_2=CHR^1$ may be selected, for example, among 1-butene, 1-hexene, 1-octene, 4-methyl-1-pentene, and preferably is 1-butene or 1-hexene.

The fusion enthalpy of the copolymer (ii) is generally higher than 50 J/g, preferably higher than 60 J/g, more preferably higher than 70 J/g. The melting temperature of the copolymer (b) is less than 140° C. and preferably between 120 and 140° C.

The Melt Index (determined according to the method ASTM D-1238, condition L) of the copolymer (ii) has values generally ranging between 5 and 1000, preferably between 5 and 100, more preferably between 5 and 30.

The component (ii) of the polyolefin composition of the invention can be conveniently prepared using a highly stereospecific catalyst, of the type described in the patent application EP-A-395083.

The copolymer (i) used in the component (A) of the invention, has a density comprised between 0.88 and 0.945 g/cm³. Preferably, these values are comprised between 0.89 and 0.94, more preferably between 0.90 and 0.935.

The Melt Index (determined by the method ASTM D-1238, condition E) of the copolymer (i) has values generally comprised between 0.01 and 100 g/10 minutes, preferably comprised between 0.1 and 10 g/10 minutes, more preferably between 0.2 and 5 g/10 minutes.

The α-olefin $CH_2$=CHR may be, for example, selected among propylene, 1-butene, 1-hexene, 1-octene, 4-methyl-1-pentene; preferably 1-butene or 1-hexene is used. In the preparation of component (i) of the composition of the invention, the olefins $CH_2$=CHR may even be used as a mixture.

The copolymer (i) is prepared by copolymerization of ethylene with an α-olefin $CH_2$=CHR, in the presence of a Ziegler-Natta type catalyst obtained by the reaction of an organometallic compound of a metal from groups II and III of the Periodic Table with a catalytic component comprising a transition metal belonging to groups IV, V or VI of the Periodic Table. Preferably the transition metal compound is supported on a solid carrier comprising magnesium halide in active form. Examples of catalysts usable in the preparation of the copolymer (a) are described in U.S. Pat. No. 4,218,339 and U.S. Pat. No. 4,472,520. The catalysts may also be prepared according to the methods described in the U.S. patents U.S. Pat. No. 4,748,221 and 4,803,251.

Particularly preferred are the catalysts comprising components having regular morphology, for example spherical or spheriforn. Examples of such catalysts are described in the patent applications EP-A-395083, EP-A-553805 and EP-A-553806.

The polymeric compositions of the invention preferably comprise from about 75 to about 95% by weight of copolymer (i) and from about 5 to about 25% by weight of copolymer (ii); preferably, the content of copolymer (i) is comprised between 75 and 90% by weight and the content of copolymer (ii) between 10% and 25% by weight.

As explained above, the component (i) is preferably a copolymer of ethylene with 1-butene and/or hexene-1, and component (ii) is preferably a copolymer of propylene with ethylene and 1-butene.

In the compositions of the invention the component (A) is preferably present in amounts of from 75 to 95 and more preferably from 80 to 95 parts by weight.

The component (A) of the invention may be prepared by mixing the components (i) and (ii) in the molten state, for example in a single or twin screw extruder. The components of the mixture may be fed directly into the extruder or may be premixed in the solid state. Preferably the said component (A) is directly prepared in polymerization operating in at least two reactors in series in which, whatever the order and using the same catalyst in the various reactors, in one of the reactors copolymer (a) is synthesized and in the other reactor copolymer (b) is synthesized. The polymerization is conveniently carried out in the gas phase using a fluidised bed reactor. In particular, the component (A) can be prepared directly by polymerization of the monomers in the gas phase, in the presence of a catalyst obtained from the reaction between:

(i) a solid catalytic component comprising a titanium compound containing at least a titanium-halogen bond supported on a magnesium halide in active form and optionally an electron-donor compound;
(ii) an Al-alkyl compound;
(iii) optionally, an electron-donor compound; operating in two or more gas-phase reactors in series in which, in any order and using the same catalyst in the various reactors:

(I) in one reactor a mixture of ethylene with an α-olefin $CH_2$=CHR, where R is an alkyl radical having 1 to 10 carbon atoms, is polymerized to obtain a copolymer of ethylene with said olefin containing up to 20% by mole of α-olefin;
(II) in another reactor a mixture of propylene, ethylene and/or an α-olefin $CH_2$=CHR$^1$, where R$^1$ is an alkyl radical having 2 to 10 carbon atoms, is polymerized to obtain the component (ii) in amounts of between 5 and 25% by weight with respect to the total polymer obtained in (I) and (II).

The polyolefin compositions of the invention may be prepared by mixing the components (A) and (B) in the molten state, for example in a single or twin screw extruder. The components of the mixture may be fed directly into the extruder or may be premixed in the solid state. In alternative, said compositions can be prepared by sequential polymerization operating in at least three reactors in series in which., whatever the order, and using the same catalyst in the various reactors, in one of the reactors is synthesized the copolymer (i), in another reactor is synthesized copolymer (ii) thus obtaining component (A), and in another reactor is synthesized component (B). Also in this case the polymerization is conveniently carried out in the gas-phase using fluidized bed reactors. The films obtained from the compositions of the invention have impact resistance (Dart test) generally higher than that of the films obtained from the corresponding component (A) alone. In addition, also an improvement in the tear resistance, determined by the Elmendorf method, is observed. However, as it can be seen from the examples below the greater improvement is obtained in the processability of the composition. In fact, by using the compositions of the invention it is possible to save energy to an extent even higher than 30% with respect to the use of component (A) alone. It is worth noting that this improvement in processability is obtained without substantial worsening of the mechanical properties.

Because of their high processability and mechanical strength characteristics, the compositions of the invention find applications in several sectors such as: blown films and cast films both monolayer and multilayer; coextruded films and laminates in which at least one layer consists of the composition of the invention, and at least one layer consists of a thermoplastic polymer, such as for example polypropylene homopolymer, copolymers of propylene with ethylene and/or α-olefin having 4–12 carbon atoms, polyethylene homopolymer (both LDPE and HDPE), copolymers of ethylene with α-olefin having 3–12 carbon atoms, ethylene-vinylacetate copolymers, polyvinylidene chloride; extrusion jackets for substrates and electric cables; injection molding; blow molding; thermoforning.

The weight ranges described for the components of the present invention refer to the relative weight ratios of the components A [(i), and (ii)] and B. Obviously, in accordance with what is known by those skilled in the art or as may readily be determined by routine tests, further polymeric components, additives (such as, for example, adhesives, stabilizers, antioxidants, anti-corrosion agents, etc.) and fillers, of either organic or inorganic nature, that are capable of imparting specific properties to the films of the invention may be added.

The following examples are given to illustrate and not to limit the invention.

CHARACTERIZATION

Determination of Isotactic Index (mmmm %). by $^{13}$C NMR

The measurement is carried out by dissolving the sample in $C_2Cl_4D_2$ and recording the spectra at a temperature of 120° C. with a DRX 500 MHz instrument operating at 125.7 MHz under proton Waltz 16 decoupling in FT mode, with 10 Khz spectral width, 90° pulse angle and 16 sec. puls repetition and 3600 scans.
Determination of Melt Index
    ASTM D 1238 condition "E"
Comonomer Content
    Percentage by weight of comonomer determined by NMR spectroscopy.
Xylene Insolubility
    2.5 g of copolymer and 250 cm$^3$ of α-xylene are placed in a glass flask fitted with a condenser and a magnetic stirrer. The temperature is increased to the boiling point of the solvent over 30 min. The clear solution thus formed is left at reflux with stirring for a further 30 min. The closed flask is then placed in a bath of ice-water for 30 min and then in a bath of water thermostatically adjusted to 25° C. for 30 min. The solid formed is then filtered off on filter paper at a high filtration rate. 100 cm$^3$ of the liquid obtained from the filtration are poured into a pre-weighed aluminum container, which is placed on a hot-plate to evaporate off the liquid under a stream of nitrogen. The container is then placed in an oven at 80° C. and maintained under vacuum until a constant weight is obtained.
Haze: ASTM D 1003;
Dart test: ASTM D 1709;
Elmendorf Tear Strength
    ASTM D 1922, determined both in machine direction (MD) and transversal direction (TD);

EXAMPLE 1

Three polymeric compositions according to the invention were prepared by mechanical mixing the amounts of component (A) (obtained by sequential copolymeration carried out according to the procedure described in Ex. 3 of WO 95/2009) and component (B) (random copolymer of butene-1 with ethylene commercialized by Shell under the name PB-8640) reported in Table 1. The characteristics of the components used were the following:

| COMPONENT (A) | |
|---|---|
| MIE | 0.95 |
| F/E | 30 |
| Density | 0.9187 |
| % component (i) | 85 |
| % component (ii) | 15 |

| COMPONENT (B) | |
|---|---|
| MIE | 0.8 |
| % wt C$_2$ | 0.75 |
| density | 0.908 |

The composition was prepared by mixing in an extruder of the (Bandera TR 60 type ?). The blend thus obtained was subsequently filmed through a COLLIN-25 blown film apparatus. The properties of the film are shown in Table 2.

EXAMPLE 2

Three polymeric compositions according to the invention were prepared by mechanical mixing the amounts of component (A), (obtained by sequential copolymeration carried out according to the procedure described in Ex. 3 of WO 95/2009) and component (B) (homopolymer of butene-1 commercialized by Shell under the name PB-0110) reported in Table 1. The characteristics of the components are the following:

| COMPONENT (A) | |
|---|---|
| MIE | 0.95 |
| F/E | 32 |
| Density | 0.917 |
| % component (i) | 85 |
| % component (ii) | 15 |

| COMPONENT (B) | |
|---|---|
| MIE | 0.4 |
| Isotactic Index (%) | 91. |

TABLE 1

|  | Example 1 | | | Comp. | Example 2 | | | Comp. |
|---|---|---|---|---|---|---|---|---|
|  | Composition 1 | Composition 2 | Composition 3 | Ex. 1 | Composition 1 | Composition 2 | Composition 3 | Ex. 2 |
| Component A p b.w. | 95 | 90 | 85 | 100 | 95 | 90 | 85 | 100 |
| Component B p.b.w. | 5 | 10 | 15 | — | 5 | 10 | 15 | — |

TABLE 2

|  | Example 1 | | | Comp. | Example 2 | | | Comp. |
| --- | --- | --- | --- | --- | --- | --- | --- | --- |
|  | Composition 1 | Composition 2 | Composition 3 | Ex. 1 | Composition 1 | Composition 2 | Composition 3 | Ex. 2 |
| Melt Pressure | 190 | 170 | 164 | 223 | 200 | 192 | 187 | 250 |
| Energy Adsorb. | 7.1 | 5.7 | 5.4 | 8.1 | 5.2 | 4.9 | 4.8 | 7.9 |
| Haze | 35 | 32 | 27 | 36 | 34 | 32 | 32 | 33 |
| Gloss | 21 | 24 | 24 | 22 | 22 | 21 | 21 | 21 |
| Dart Test | 126 | 110 | 83 | 88 | 85 | 88 | 105 | 98 |
| Elmendorf TD | 420 | 450 | 490 | 420 | 410 | 400 | 430 | 440 |
| MD | 190 | 215 | 220 | 140 | 170 | 230 | 300 | 200 |

What is claimed is:

1. Polyolefin compositions comprising from 70 to 99 parts by weight of a composition (A) comprising (i) from 75 to 95% by weight of a copolymer of ethylene with an α-olefin $CH_2=CHR$, wherein R is an alkyl radical having from 1 to 10 carbon atoms, said copolymer containing up to 20% by mole of α-olefin and (ii) from 5 to 25% by weight of a copolymer of propylene with ethylene and/or an α-olefin $CH_2=CHR^1$, wherein $R^1$ is an alkyl radical having from 2 to 10 carbon atoms, said copolymer containing from 80 to 98% by weight of propylene and being characterized by insolubility in xylene of higher than 70%, and from 1 to 30 parts by weight of a polyolefin component (B) comprising crystalline polybutene-1.

2. Polyolefin compositions according to claim 1 characterized in that the component (B) is present in amounts of from 5 to 25 parts by weight.

3. Polyolefin compositions according to claim 2 characterized in that the component (B) is present in amounts of from 5 to 20 parts by weight.

4. Polyolefin compositions according to claim 1 characterized in that the component (B) is polybutene-1 having a predominantly isotactic structure.

5. Polyolefin compositions according to claim 4 characterized in that the polybutene-1 has an isotacticity (expressed in terms of pentads mmmm %) higher than 80%.

6. Polyolefin compositions according to claim 5 characterized in that the polybutene-1 has an isotacticity higher than 90%.

7. Polyolefin compositions according to any of the claims 1–6 in which the polybutene-1 is a butene-1 copolymer with one or more other olefin(s).

8. Polyolefin compositions according to claim 7 in which the olefin(s) is(are) selected from the group consisting of ethylene, propylene, pentene-1, hexene-1 and octene-1.

9. Polyolefin compositions according to claim 8 in which the olefin is ethylene or propylene.

10. Polyolefin compositions according to claim 7 in which the polybutene-1 is a random copolymer containing up to 20% by weight of units deriving from ethylene or propylene or both.

11. Polyolefin compositions according to claim 1 characterized in that the component (A) is present in amounts of from 75 to 95.

12. Polyolefin compositions according to claim 1 characterized in that the component (A) is present in amounts of from 80 to 95 parts by weight.

13. Polyolefin compositions according to claim 1 characterized in that the component (i) has a density of from 0.88 to 0.945 $g/cm^3$.

14. Polyolefin compositions according to claim 1 characterized in that the component (i) has a Melt Index "E" in the range between 0.01 and 100 g/10 minutes.

15. Polyolefin compositions according to claim 14 characterized in that the component (i) has a Melt Index "E" in the range between 0.1 and 10 g/10 minutes.

16. Polyolefin compositions according to claim 1 characterized in that in the component (i) the α-olefin is selected among propylene, 1-butene, 1-hexene, 1-octene, 4-methyl-1-pentene.

17. Polyolefin compositions according to claim 1 characterized in that the insolubility in xylene of component (ii) is higher than 75%.

18. Polyolefin compositions according to claim 1 characterized in that in the said copolymer (ii) the content of propylene ranges between 85 and 96% by weight, and the content of ethylene and/or α-olefin ranges between 4 and 15% by weight.

19. Polyolefin compositions according to claim 1 characterized in that the copolymer (ii) is a terpolymer of ethylene, propylene and an α-olefin and the content of ethylene ranges from 2 to 8% by weight while the content of the α-olefin ranges between 2 and 7% by weight.

20. Polyolefin compositions according to claim 19 characterized in that the component (i) is a copolymer of ethylene with 1-butene and/or hexene-1, and component (ii) is a copolymer of propylene with ethylene and 1-butene.

21. A polyolefin composition according to claim 19 characterized in that the α-olefin is 1-butene or 1-hexene.

22. Mono- or multi-layer films comprising at least one layer of the polyolefin composition as in any one of claims 1–6 or 11–21 inclusive.

23. Foamed articles obtained from the polyolefin composition as in any one of claims 1–6 or 11–21 inclusive.

* * * * *